United States Patent [19]

Skagerlund

[11] Patent Number: 5,102,219
[45] Date of Patent: Apr. 7, 1992

[54] METHOD AND MEANS IN OPTICAL DISTANCE METERS

[75] Inventor: Lars-Erik Skagerlund, Karlskoga, Sweden

[73] Assignee: Optab Optronikinnovation Aktiebolag, Karlskoga, Sweden

[21] Appl. No.: 638,850

[22] Filed: Jan. 8, 1991

[30] Foreign Application Priority Data

Jan. 12, 1990 [SE] Sweden ................. 9000103

[51] Int. Cl.$^5$ .................. G01C 3/08; G01S 13/08
[52] U.S. Cl. ........................ 356/5; 342/135; 342/195
[58] Field of Search ............... 356/5; 342/195, 135; 364/569, 572, 923.4; 307/350, 354, 360, 517, 518

[56] References Cited

U.S. PATENT DOCUMENTS 4,786,168 11/1988 Meyers et al. ............... 356/28.5

Primary Examiner—Stephen C. Buczinski
Attorney, Agent, or Firm—Dennison, Meserole, Pollack & Scheiner

[57] ABSTRACT

In order to improve the measuring accuracy in optical distance meters determining transit-time, the meters having optical senders emitting short pulses (11), optical receivers in which the reflected pulse received from the object to which the distance is being measured is converted to a corresponding electrical pulse (12), the signal received is repeatedly digitalized (13a, 13b, etc.) and these digital values are stored in a memory. Each of these stored values, is then fed from the memory one by one a predetermined number of times (14a, 14b, etc.) to a digital low-pass filter with deriving characteristic within its pass band. The number of computations of this filter before the output magnitude (15a, 15b, etc.) of the filter passes zero (16) constitutes a measurement (17) of the distance to the object being measured.

6 Claims, 2 Drawing Sheets

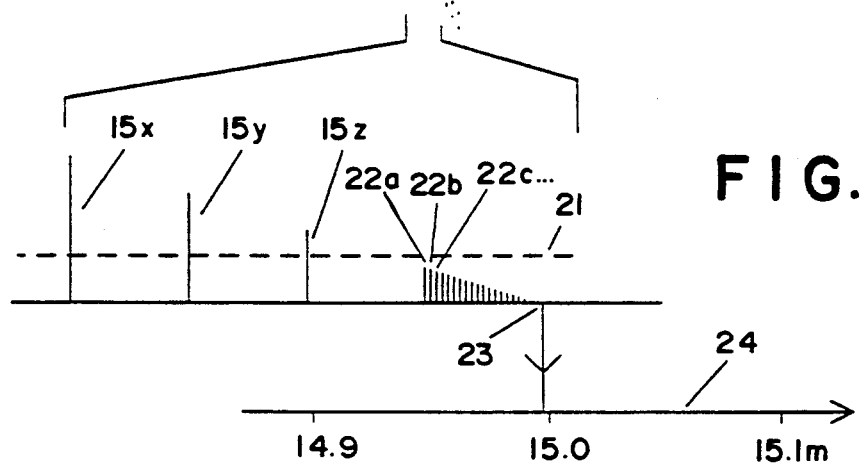
FIG. 2a
FIG. 2b
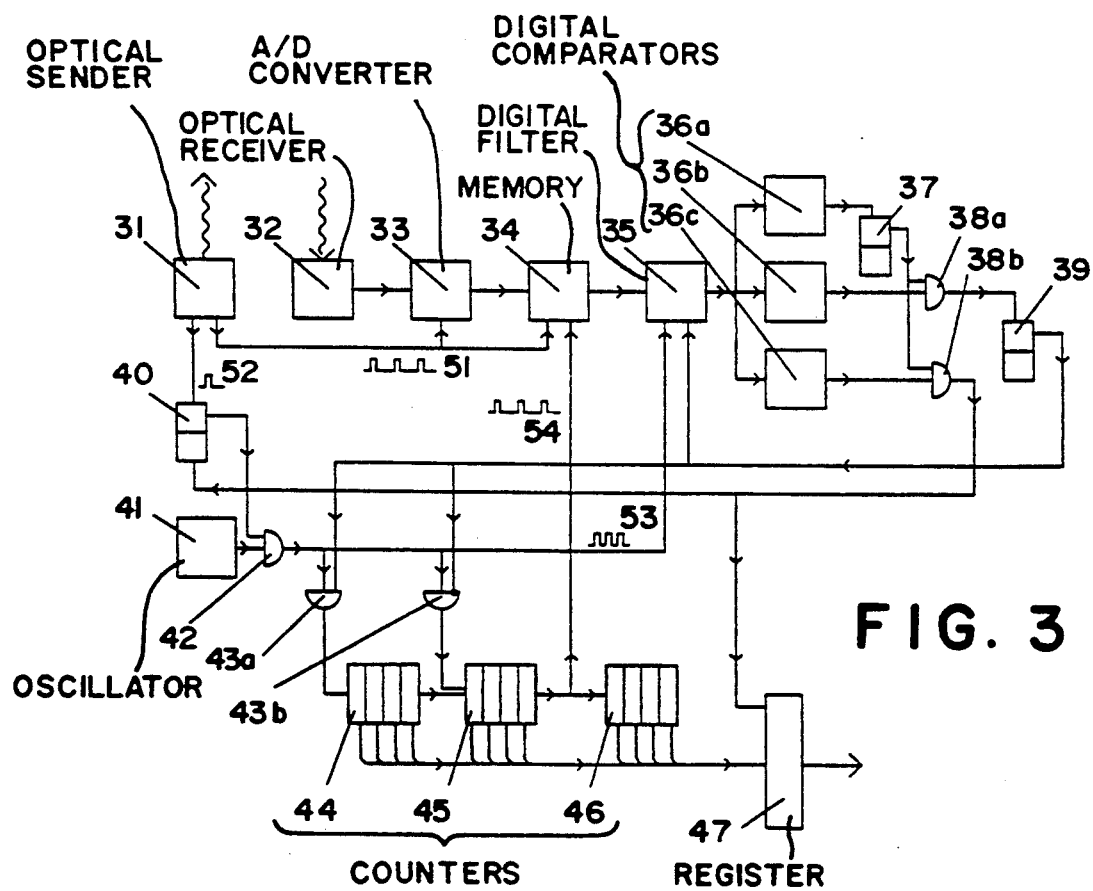
FIG. 3

METHOD AND MEANS IN OPTICAL DISTANCE METERS

BACKGROUND OF THE INVENTION

The present invention relates to a method and, means for achieving good measuring accuracy in pulsed optical distance meters of transit-time type. By this is meant distance meters comprising an optical sender, preferably a laser, emitting very short optical pulses. When the optical pulses encounter the object to be measured, a part of the radiation is reflected to an optical receiver which is built into the distance meter. The delay occuring between the emitted and the received optical pulse serves as a measurement of the distance between distance meter and measured object.

In distance meters of the type described it has long been customary to use an electronic clock consisting of a crystal-controlled oscillator, and a counter which is successively stepped forward by the oscillator, to measure the time between emitted and received pulse. This counter, which is initially set at zero, is started when the optical pulse is emitted and stopped when the reflected pulse is received. In order to achieve good measuring accuracy the counter must permit time measurement with good resolution, and this in turn demands a high-frequency oscillator. Furthermore, it must be possible to determine the time at which the pulse is received with good reproduceability. The optical receiver generally includes a photo-detector and an amplifier with band pass characteristic. The band width of the amplifier is normally adjusted to give prominence to the signal pulse received as far as possible over noise and interference. With this type of filtering the electrical output signal from the optical receiver will consist of pulses whose rise and fall times are of the same order of magnitude as the pulse length measured at half the amplitude value. A binary signal representing a logical one is required as stop signal for the counter at the time when a pulse is received, as well as a logical zero before. Such a signal is usually effected by the output pulse from the receiver being supplied to a threshold circuit arranged to emit a logical one when the signal amplitude from the optical receiver exceeds a certain predetermined value, but otherwise to emit a logical zero. The uncertainty which is therefore obtained in the time-determination is dependent on the variations in signal amplitude obtained due to varying distance to the object being measured and due to atmospheric conditions. If the signal has low amplitude the predetermined threshold level will be exceeded at an early stage of the pulse's duration whereas if the signal has high amplitude the threshold will only be exceeded close to maximum amplitude at the mid-point in time of the pulse. This means that a measurement-uncertainty share is obtained which is of the same order of magnitude as the rise time of the pulse. Thus, in a distance meter with high measuring accuracy, an extremely high oscillator frequency is required and the pulses emitted must also be very short. In the pulsed laser distance meter currently in use, the half-value width of the pulse length is usually 30–60 nanoseconds and the oscillator frequency is usually 14,990 or 29,979 megaherz, which gives a measuring resolution of 10 and 5 meter, respectively. The most modern technology now enables shorter pulses and considerably higher oscillator frequencies but such technology is complicated both from the design and the manufacturing point of view, thus making such distance meters expensive.

Swedish patent No. 8 605 335-2, for instance, describes a technique for circumventing the problems described above. Characteristic of the invention according to said patent is that both the pulse emitted and that received are transmitted via analog-digital converters to series of binary numbers which are stored in shift registers or similar memories. By shifting the contents in one of the shift registers step by step once storage has been performed, and by counting the correlation coefficient between the contents in the two shift registers at each step, a position can be found where the correlation coefficient has its greatest value. The number of steps required to reach this position constitutes a measurement of the delay between the pulse emitted and that received. If the correlation optimum happens to be between two steps it can be determined by interpolation. A tenfold improvement of the measuring accuracy can easily be achieved by using the invention according to this patent. However, devices accordance to said patent have the drawback that they require a vast amount of electronic equipment and measuring the distance is time-consuming because of the large number of counting operations required to determine correlation, and this in turn limits how often measurement of the distance can be repeated.

SUMMARY OF THE INVENTION

The object of the present invention is to achieve a method and means which provides measuring accuracy equivalent to that obtained in the invention referred to, but which requires a fraction of its electronic equipment. As in the previously known invention an analog-digital converter is used to convert the signal pulse received to a series of binary numbers which are stored in a memory of so-called FIFO-type (first in first out), such as a shift register. The present invention is characterised in that each of these stored binary number values is supplied a predetermined number of times in sequence to a digital low-pass filter with deriving characteristic within its pass band. The output magnitude from this filter has a zero through-passage, and another characteristic of the invention is that the number of computations of the digital filter which must be performed before zero is passed is registered and used as a measurement of the distance to the measured object.

In a further development of the invention a method is described of achieving better measuring accuracy than is equivalent to one unit in the coefficient for the number of computations of the filter. Characteristic of this further development is that the digital filter has an ability to switch which greatly decreases the size of the integration step of the filter as well as increasing the number of times that one and the same binary number from the memory is supplied to the digital filter. This switch-over is effected when the size of the output signal from the digital filter indicates that passage through zero is imminent.

In another further development of the invention, a condition is introduced entailing that the output signal of the filter must have reached a certain amplitude before the zero passage which is utilized to determine the distance. This greatly reduces the risk of in-coming noise and interference causing erroneous measurements.

Means suitable for performing the methods described also constitute a further development of the invention.

Brief Description of the Drawings

The invention will now be described in more detail with reference to the drawings in which:

FIG. 1 shows a signal diagram in the method according to the invention.

FIG. 2a shows an output signal from the digital filter.

FIG. 2b shows in an expanded form the process at the time of passage through zero.

FIG. 3 shows, in block diagram form, an embodiment of the distance meter according to the invention by way of example.

DESCRIPTION OF THE INVENTION

Figure 1A:
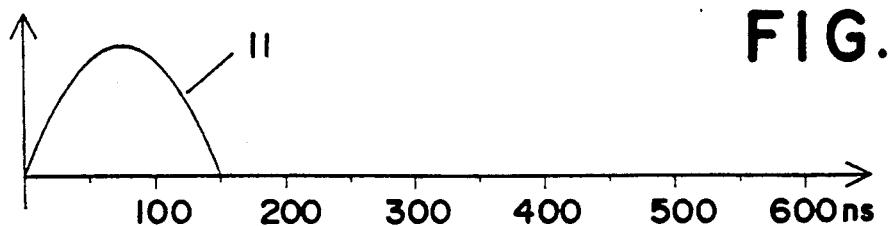
FIG. 1a shows an amplitude of a pulse emitted as a function of time.
Figure 1B:
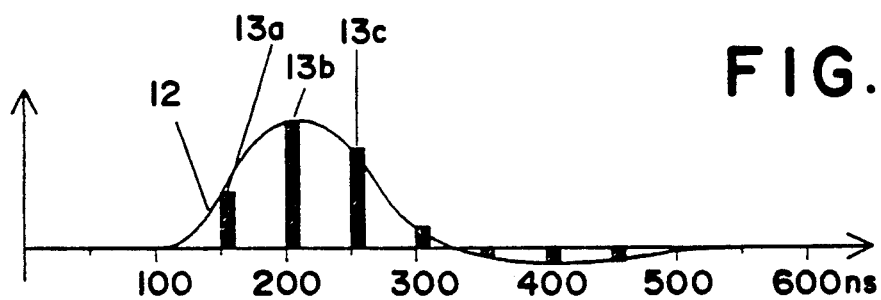
FIG. 1b shows a received pulse as obtained as an electric output signal.

FIG. 1a shows the amplitude of the pulse emitted as a function of the time. FIG. 1b shows the received pulse 12 as obtained as an electric output signal from the receiver. It is delayed proportionally to the distance to the measured object and its pulse shape is somewhat altered due to the electrical band-pass filtering in the receiver which gives the signal prominence over noise and interference. In the same figure the binary numbers obtained from the analog-digital converter are represented in stack form, these binary numbers representing the signal amplitude at a number of regular intervals during the existence of the pulse. The period between conversions must be shorter than the length of the pulse received and the stored values must at least cover the time from when an optical pulse is emitted to the time when the pulse received from the most remote object to which the distance is being measured has ended.

A digital filter of the type to which the present invention relates can be generally formulated in a system of equations in the following manner, for instance:

$$x_{1,n} = k_{10}x_{1n,n} + k_{11}x_{1,n-1} + \ldots + k_{1p}x_{1,n-p}$$
$$x_{2,n} = k_{21}x_{1,n} + k_{22}x_{2,n-1} + \ldots + k_{2p}x_{2,n-p}$$
$$\ldots$$
$$x_{q,n} = k_{q1}x_{q,n} + k_{q2}x_{q,n-1} + \ldots + k_{qp}x_{q,n-p}$$

In this equation system k denotes filter constants whose values determine the properties of the filter and x denote filter variables. Of these $x_{in}$ is the input magnitude whereas the values of the others are determined by the digital filter itself. One of these others constitutes the output magnitude of the filter. In comparison with an analog filter the equation system corresponds to the system of differential equations which describe the properties of the analog filter. The most significant difference, apart from the fact that all magnitudes are quantified by being computed with a finite number of numbers is that the infinitessimal magnitude time differential dt of the analog filter is approximated with a finite magnitude time interval $\Delta t$ (the filter integration step) the size of which is determined by the choice of filter constants. When the digital filter is used, the equations are computed repeatedly, n indicating the sequence number of the computation. Each time the filter is computed the output magnitude is obtained at an equivalent moment which $\Delta t$ later than the preceding computation.

Due to the choice of filter constant values, the filter according to the invention is given a frequency characteristic in which the amplitude factor of the transmission function is substantially proportional to the frequency at frequencies considerably lower than a predetermined cutoff frequency, whereas in the case of frequencies considerably higher than this cutoff frequency, it is inversely proportional to the frequency or to some higher integer power of this. The cutoff frequency should be in specific ratio to the pulse length of the distance meter if optimum result is to be achieved. The frequency characteristic at low frequencies gives the filter deriving properties. This means that, when the digitalized pulse received constitutes the input signal to the digital filter, the peak value of this input pulse will have correspondence in an accurately detectable passage of the output signal of the filter through zero. Since the equivalent time for this passage through zero is linearly dependent on the distance to the object and since this time can be calculated as $n \cdot \Delta t$, the number of computations before zero-passage occurs constitutes a linear measurement of the distance to the object.

Figure 1C:
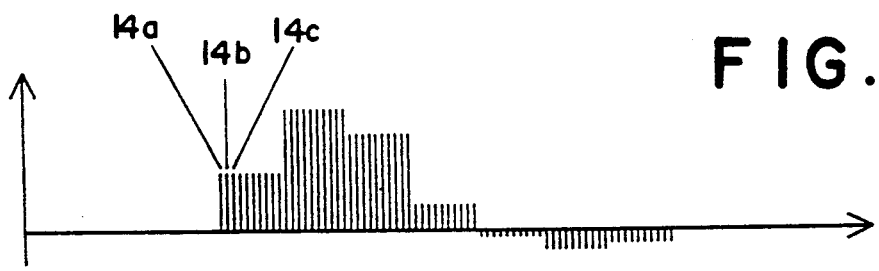
FIG. 1c shows in stacked form binary numbers supplied to a digital filter.
Figure 1D:
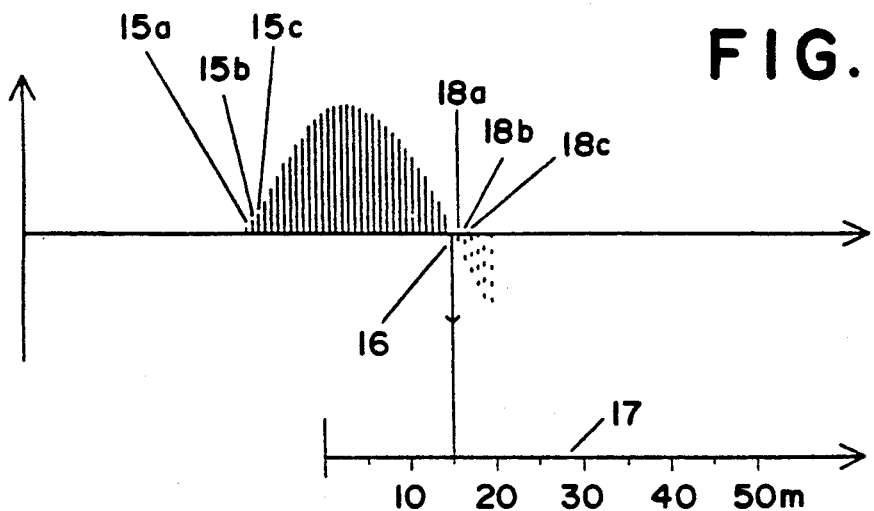
FIG. 1d shows an output signal of the filter in stacked form.

The measurement resolution obtained with the filtration stated is equal to the filter integration step, which should consequently be made short. When the stated binary number series of the analog-digital converter is utilized directly as input magnitude for the digital filter the filter integration step must be chosen equal to the time interval between the analog-digital conversions. It is thus advisable for the conversions to take place at as high a repetition frequency as possible. However, the available technology for analog-digital converters sets a limit in this respect. A certain amount of time is also needed each time the digital filter is counted through. The latter problem is circumvented by having the digital values stored first in an interim memory, e.g. a shift register, from whence they are passed on to the filter more slowly. The first-mentioned problem can be circumvented according to the invention by allowing each of the number values from the analog-digital converter to be repeatedly supplied to the digital filter a predetermined number of times, m. The filter integration step is made correspondingly shorter by a suitable choice of filter constants. FIG. 1c represents in stack form 14a, 14b, 14c, etc., the binary numbers thus supplied to the digital filter. In the example in the diagram m=0, indicating that each value is supplied ten times to the filter. The digital filter has falling frequency characteristic (low pass filter) above its cutoff frequency, thus enabling it to even out the deviations from the correct curve shape as represented by the plateaux in FIG. 1c. In other words, the filter re-creates the signal m times between the conversion times of the analog-digital converter, and the output magnitude of the digital filter passes through zero with correspondingly better resolution. The output signal of the filter is shown in FIG. 1d in stack form 15a, 15b, 15c, etc. By continuosly checking the sign of each output data value from the filter, the signal's passage through zero 16 is detected and the distance from distance meter to measured object can be determined by means of a linear ratio 17 from the number of filter computations before zero is passed. When zero-passage has been detected the filter computations can be interrupted and all filter variables cleared ready for the next distance measurement. The values 18a, 18b, 18c, etc. after passage through zero need not therefore be taken into consideration.

A desirably small resolution can be obtained by selected a high value for the repetition coefficient m. One drawback of a high repetition coefficient is that the number of filter computations before zero-passage will be extremely large and since each computation takes a certain amount of time to perform, the delay from when the measurement is taken until the result is obtained may be unacceptably long. FIGS. 2a and 2b show a method involving a further development of the inventive concept which solves this problem. FIG. 2a shows the output signal from the digital filter. Until immediately prior to passage through zero, this is identical to the signal illustrated in FIG. 1d. FIG. 2b shows in an expanded diagram the process at the time of passage through zero. Initially the repetition coefficient m has a relatively moderate value and the number of computations will thus also be moderate. By comparing the output signal of the filter with a reference level 21, for instance, a warning can be obtained when passage through zero is imminent. A switch-over is then effected in the filter by changing to a different set of filter constants so that the integration step is greatly reduced, while at the same time increasing the repetition coefficient in relation thereto. The size of the integration step before the switch-over is represented in FIG. 2b by the intervall between the stacks 15x, 15y and 15z, and after the switch-over by 22a, 22b, 22c, etc. At the actual passage through zero 23, therefore, the integration step is extremely small, which gives correspondingly excellent resolution at distance determination 24.

The technical effect of the described methods will be illustrated here by an example. Using modern (1989) technology analog-digital converters can be produced relatively easily for measuring repetition frequencies up to about 30 megaherz, which gives a measuring resolution of 5 meter. Theoretically, 100 filter computations would be needed for a measuring distance of 500 meter. If new filter computations can be started at intervals of 200 nanosecond, the evaluation time would be 20 microsecond. If each value is supplied to the digital filter ten times ($m=10$), the measuring resolution would be 50 centimeter and the evaluation time would be 200 microsecond. If the value of m is increased to 100 immediately prior to passing through zero, the measuring resolution becomes 5 centimeter but the evaluation time is only increased to 202-204 microsecond.

When measuring to objects at a great distance the delay until receipt of the return pulse will be relatively long. During this time there is risk of noise and interference giving rise to false zero-passages from the digital filter. This problem can be solved by introducing a condition that at least one output data value from the digital filter must have reached a minimum threshold value before any passage through zero will be approved.

FIG. 3 shows an embodiment of a distance meter constructed from an optical sender 31 and an optical receiver 32. The electrical output signal from the receiver is supplied via an analog-digital converter 33 to a memory 34 of FIFO type. The optical sender includes electronic circuits which emit control signals in the form of a pulse train 51 every time an optical measuring pulse is emitted. Each pulse in the control signal triggers an analog-digital conversion in the analog-digital converter 33 and storage of the digital output magnitude from the analog-digital converter in a memory 34.

After the last pulse in the pulse train this magnitude is stored in the memory at a number of times (13a, 13b, etc in FIG. 1b). These values can in turn be made accessible at the memory output for continued signal processing by supplying pulses 54 to the memory.

A high-speed micro-computer in which the methods according to the invention have been programmed in known manner can be used for continued processing of the signal. FIG. 3 shows an alternative with logical function blocks, which gives faster signal processing and thus enables distance measurements to be performed more frequently. At the last control-signal pulse in the pulse train 51 a start pulse 52 is emitted which sets a bi-stable flip-flop 40 to one, whereupon a gate 42 allows the pulses to pass from a clock oscillator 41. These pulses 53 constitute control signals to a digital filter 35 having the filter characteristics mentioned earlier. The filter may be constructed in known manner of a number of registers, one for each equation in the equation system pertaining to the filter. The registers are joined to each other and to the output of the memory 34 via adders and constant-multiplying gate matrices. Computation of the filter is obtained by means of a clock signal sent simultaneously to all registers of the filter. This clock signal thus consists of the pulses 53. These pulses also pass a gate 43b, the output signal of which steps forward a counter 45, the second counter in a chain of counters. For each complete revolution of this counter a pulse 54 is obtained which causes the memory 34 to change its output magnitude to the next one of those stored. Each number value stored in the memory will thus be supplied to the digital filter the number of times which corresponds to the number of counter steps in the second counter 45. The output pulses from the counter 45 also step forward a third counter 46 which thus counts the number of number values which have been fed out from the memory.

The output magnitude from the digital filter 35 constitutes the input magnitude to three digital comparators of which the first, 36a, sets a bi-stable flip-flop 37 to one when and if its input magnitude exceeds a predetermined value. This enables the output signals from the two other comparators to pass via the gates 38a and 38b. A condition is thus obtained that the output magnitude of the filter must have reached a certain value before the search for zero-passage is started. The second digital comparator 36b sets a bi-stable flip-flop 39 to one when its input magnitude falls below a predetermined minimum value. When this flip-flop is set to one, the digital filter 35 is switched over to an alternative set of filter constants entailing decreased filter integration steps. At the same time, a switch-over occurs via the gates 43a-43b b so that the clock pulses 53 are supplied to a first counter 44 instead of to the second counter 45, which is now instead stepped forward by the output signal from the first counter 44. This increases the number of times each value is supplied to the digital filter by a factor equal to the number of steps in the first counter.

The third digital comparator 36c steps the bi-stable flip-flop 40 to zero when the comparator's input signal becomes negative, i.e. upon passage through zero. At the same time the standing of the counters 44, 45 and 46 is transferred to a register 47 in such a way that the number value from the first counter 44 constitutes the least significant part of the number in register 47 and the number value from the third counter 46 constitutes the most significant part. The number in register 47 is a measurement of the distance to the object. When the number value has been transferred to register 47, via control circuits not shown in FIG. 3, the memory, bistable flip-flops, counters and digital filter with respect to the internal filter variables are also cleared. The device is then ready to perform new measurements.

I claim:

1. A method for optically measuring distance, comprising the steps of emitting short pulses by an optical sender, receiving by an optical receiver the sender's reflected radiation pulses from an object to which a distance is being measured, converting by an analog-digital converter said reflected radiation pulses into digital amplitude values where periods between the conversions are shorter than the length of the radiation pulses received, obtaining a number of the digital amplitude values from the analog-digital converter wherein the obtained digital amplitude values correspond at least to a time from the emission of said short pulse to a time when the reflected radiation pulse received from the object to which the distance is being measured has ended, storing each of said digital amplitude values, one by one and a predetermined number of times, generating an output magnitude from a digital filtering process having such characteristic that, in the case of frequencies considerably lower than a predetermined cutoff frequency, the output magnitude is substantially directly proportional to the frequency and that, in the case of frequencies considerably higher than this cutoff frequency, the output magnitude is inversely proportional to the frequency raised to an integer greater than zero, and that the number of computations of the filter before the output magnitude of the filter passes zero (16) for the first time is used as a linear measurement (17) of the distance to the object being measured.

2. A method as claimed in claim 1, further comprising the steps of:
obtaining a substantially unaltered filter characteristic by increasing the number of times that the output magnitude is counted through the filter when a low value of the output magnitude indicates that passage through zero is imminent; and
changing simultaneously the parameters of the filter.

3. A method as claimed in claim 1, further comprising the step of: counting only through zero after the output magnitude of the filter has exceeded a certain predetermined minimum value.

4. An apparatus for optically measuring distance, said apparatus comprising:

an optical sender for emitting short pulses;
an optical receiver for receiving the sender's reflected radiation pulses from an object to which a distance is being measured;
an analog-digital converter for converting said reflected radiation pulses into digital amplitude values wherein periods between the conversions are shorter than the length of the radiation pulses received;
means for obtaining a number of the digital amplitude values from the analog-digital converter wherein the obtained digital amplitude values correspond at least to a time from the emission of said short pulse to a time when the reflected radiation pulse received from the object to which the distance is being measured has ended;
means for storing each of said digital amplitude values, one by one and a predetermined number of times;
means for generating an output magnitude from a digital filtering process having such characteristic that, in the case of frequencies considerably lower than a predetermined cutoff frequency, the output magnitude is substantially directly proportional to the frequency and that, in the case of frequencies considerably higher than this cutoff frequency, the output magnitude is inversely proportional to the frequency raised to an integer greater than zero; and
means for using the number of computations of the filtering process passing zero for the first time as a linear measurement of the distance to the object being measured.

5. The apparatus for optically measuring distance, as recited in claim 4, further comprising:
means for increasing the number of times that the output magnitude is counted through the filtering process when a low value of the output magnitude indicates that passage through zero is imminent for obtaining a substantially unaltered filter characteristic; and
means for simultaneously changing parameters of the filtering process.

6. The apparatus for optically measuring distance, as recited in claim 4, comprising:
means for counting only through zero after the output magnitude of the filtering process exceeds a certain predetermined minimum value.

* * * * *